(12) United States Patent
Clayton et al.

(10) Patent No.: US 7,137,333 B2
(45) Date of Patent: Nov. 21, 2006

(54) SINGLE-PIECE ELECTRO-POLISHED AIR CYLINDER FOR A FLUID COUPLING DEVICE

(75) Inventors: Gary W. Clayton, Concord, MI (US); Samuel E. Settineri, Marshall, MI (US); Christopher D. Reniger, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 108 days.

(21) Appl. No.: 10/904,005

(22) Filed: Oct. 19, 2004

(65) Prior Publication Data

US 2006/0081123 A1     Apr. 20, 2006

(51) Int. Cl.
    *F16J 10/00*   (2006.01)
(52) U.S. Cl. .................. 92/169.1; 92/165 PR
(58) Field of Classification Search .............. 92/169.1, 92/169.2, 169.3, 169.4, 165 PR
    See application file for complete search history.

(56) References Cited

U.S. PATENT DOCUMENTS

| | | | |
|---|---|---|---|
| 3,985,214 A * | 10/1976 | Hall et al. .............. | 92/165 PR |
| 4,051,936 A | 10/1977 | Crisenbery et al. | |
| 4,068,748 A | 1/1978 | Charchian et al. | |
| 4,217,976 A | 8/1980 | DeJong | |
| 4,235,322 A | 11/1980 | Sutaruk | |
| 4,269,295 A | 5/1981 | Kish | |
| 4,278,159 A | 7/1981 | Roth et al. | |
| 4,303,488 A * | 12/1981 | Seiler et al. ................ | 204/498 |
| 4,421,216 A | 12/1983 | Ellis | |
| 4,515,677 A * | 5/1985 | Heathcoat et al. .......... | 204/625 |
| 4,541,516 A * | 9/1985 | Fenzel ................... | 192/85 CA |
| 4,638,900 A * | 1/1987 | Deem et al. ............ | 192/85 CA |
| 4,735,300 A | 4/1988 | Brown | |
| 5,001,013 A * | 3/1991 | Sturwold et al. ........... | 428/467 |
| 5,305,865 A | 4/1994 | Larson et al. | |
| 5,960,918 A | 10/1999 | Moser et al. | |
| 6,120,257 A * | 9/2000 | Saiki et al. ................. | 417/223 |
| 6,390,567 B1 * | 5/2002 | Hurlbutt ...................... | 92/128 |
| 6,719,115 B1 * | 4/2004 | Rogner et al. ............. | 92/169.1 |

\* cited by examiner

Primary Examiner—Edward K. Look
Assistant Examiner—Michael Leslie
(74) Attorney, Agent, or Firm—Greg Dziegielewski, Esq.; Artz & Artz, P.C.

(57) ABSTRACT

One advantageous embodiment of the claimed invention is an air cylinder (12) for a pneumatic fan drive system (10). The air cylinder (12) is comprised of a single-piece stamping, which is utilized for covering a piston (22) of the pneumatic fan drive system (10). This single-piece stamping has an e-coating (40) applied thereon for improving a surface finish of the single-piece stamping and inhibiting corrosion of said single-piece stamping.

17 Claims, 2 Drawing Sheets

SINGLE-PIECE ELECTRO-POLISHED AIR CYLINDER FOR A FLUID COUPLING DEVICE

TECHNICAL FIELD

The invention relates generally to fluid coupling devices and more specifically to a fluid coupling device having a single-piece electro-polished air cylinder for increasing the life of the fluid coupling, decreasing manufacturing cycle time, and minimizing costs associated therewith.

BACKGROUND ART

Existing fluid couplings typically include a two-piece air cylinder with a generally thin-walled stainless steel construction. These two-piece air cylinders usually include a substantially long cylinder member and a separate washer member spot-welded to the cylinder member. As is known in the art, the stainless steel material typically is resistant to corrosion. However, drawing stainless steel to a sufficient depth can produce cracks, scars, scratches, or various other imperfections in the stainless steel. These imperfections can cause substantial wear on components, e.g. seal rings, which contact and slide across the surface of the air cylinder. Also, it is understood that the thin-walled construction of typical air cylinders can be easily damaged if dropped or otherwise mishandled during shipping.

It would therefore be desirable to provide a fluid coupling having a single-piece air cylinder for increasing the life of fluid coupling, minimizing manufacturing cycle time of the fluid coupling, and decreasing costs associated therewith.

SUMMARY OF THE INVENTION

One advantageous embodiment of the claimed invention is an air cylinder for a pneumatic fan drive system. The air cylinder is comprised of a single-piece stamping, which is utilized for covering a piston of the pneumatic fan drive system. This single-piece stamping has an e-coating applied thereon for improving a surface finish of the single-piece stamping and inhibiting corrosion of said single-piece stamping.

One advantage of the invention is that an air cylinder is provided that has a substantially smooth surface finish for increasing the life of a seal contacting the air cylinder.

Another advantage of the invention is that an air cylinder is provided that has an e-coating surface treatment for resisting corrosion and increasing the life of the air cylinder.

Yet another advantage of the invention is that an air cylinder is provided that has a one-piece construction for decreasing manufacturing cycle time and costs associated therewith.

Still another advantage of the invention is that an air cylinder is provided that has an e-coating surface treatment for minimizing manufacturing-related waste so as to preserve the environment and decrease manufacturing costs.

Yet another advantage of the invention is that an air cylinder is provided that has a substantially robust construction for resisting damage associated with dropping or otherwise mishandling the air cylinder.

Other features, benefits and advantages of the present invention will become apparent from the following description of the invention, when viewed in accordance with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
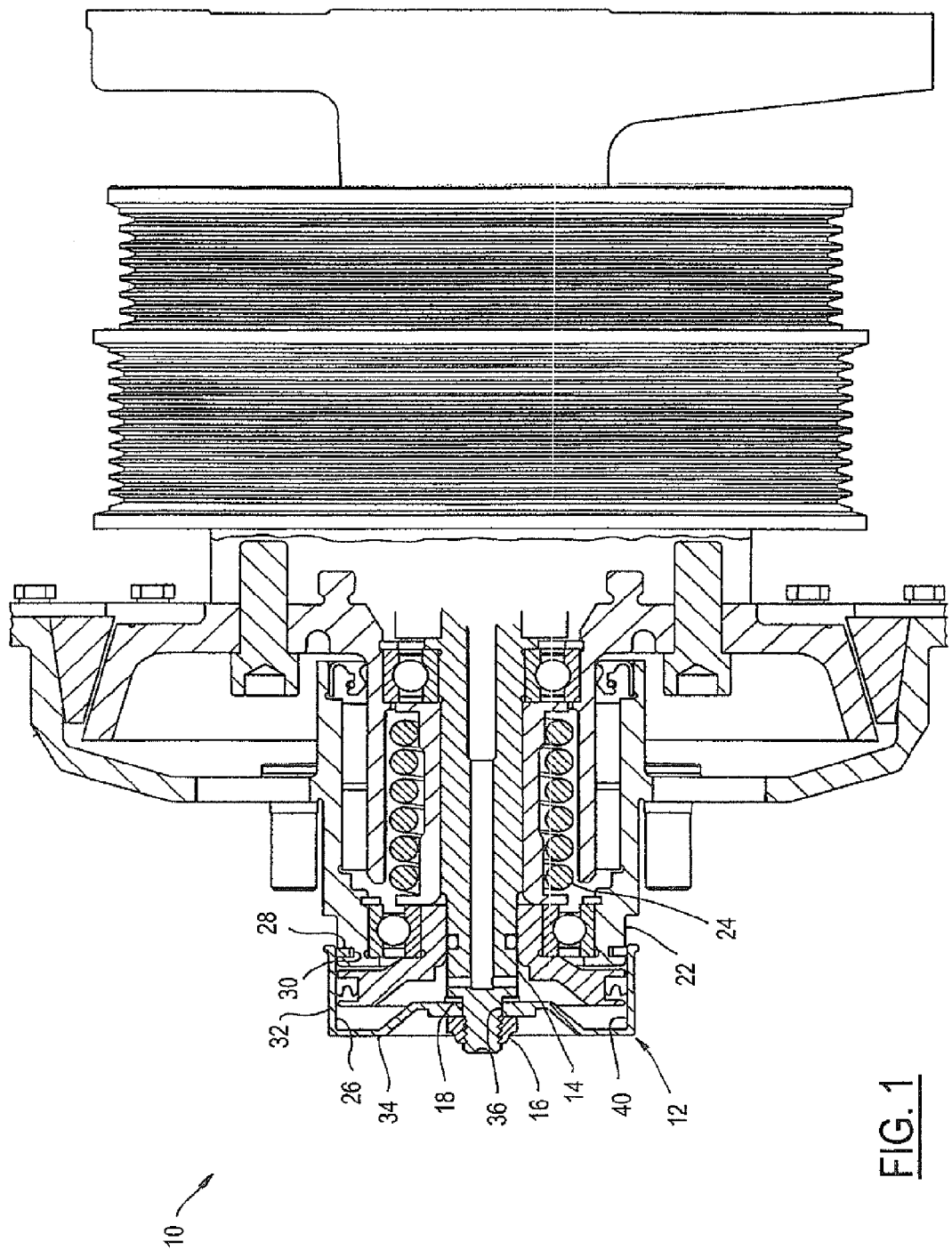
FIG. 1 is a partially cutaway view of a pneumatic fan drive system having a single-piece electro-polished air cylinder, according to one advantageous embodiment of the claimed invention.

In the following figures the same reference numerals are utilized for designating the same or similar components in the various views. Moreover, the illustrated embodiments described herein employ features where the context permits, e.g. when a specific result or advantage of the claimed invention is desired. Specifically, the embodiments described herein implement a single-piece electro-polished air cylinder within a pneumatic fan drive system. However, it is contemplated that the air cylinder can be utilized for various other fluid coupling devices or within other suitable systems as desired. In this respect, it will be appreciated that various embodiments are contemplated having different combinations of the described features, having features other than those described herein, or lacking one or more of those features. For these reasons, it is understood that the invention can be carried out in a variety of suitable modes.

Referring to FIG. 1 there is shown a partially cutaway view of a pneumatic fan drive system 10 having a single-piece electro-polished air cylinder 12 ("air cylinder"), according to one advantageous embodiment of the claimed invention. The air cylinder 12 is secured to a piston rod 14 via a nut 16. Additionally, the air cylinder 12 and the piston rod 14 have a seal 18 sandwiched therebetween with sufficient force for withstanding a pressure of about 120 psi within the air cylinder 12. In other words, sufficient torque is applied to the nut 16 for engaging the seal 18 to the air cylinder 12 and the piston rod 14 and increasing the life of the seal 18.

The piston rod 14 has a channel 20 formed therein for supplying pressurized air to the air cylinder 12. In that way, the pressurized air forces a piston 22 away from the air cylinder 12 and compresses a spring 24, which otherwise forces the piston 22 toward the air cylinder 12. This feature disengages the clutch and decreases the fan speed to idle.

Also, in this embodiment, the air cylinder 12 has a surface 26 for contacting a gasket 28 disposed within a recess 30 of the piston 22. It will be appreciated that the gasket 28 is utilized for sufficiently sealing air within the air cylinder 12 and allowing the pressurized air to move the piston 22 against the force of the spring 24.

Figure 2:
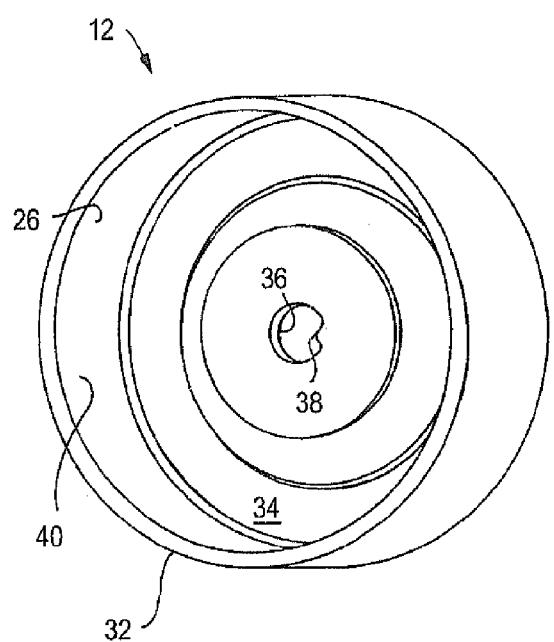
FIG. 2 is a perspective interior view of the single-piece electro-polished air cylinder shown in FIG. 1.
Figure 3:
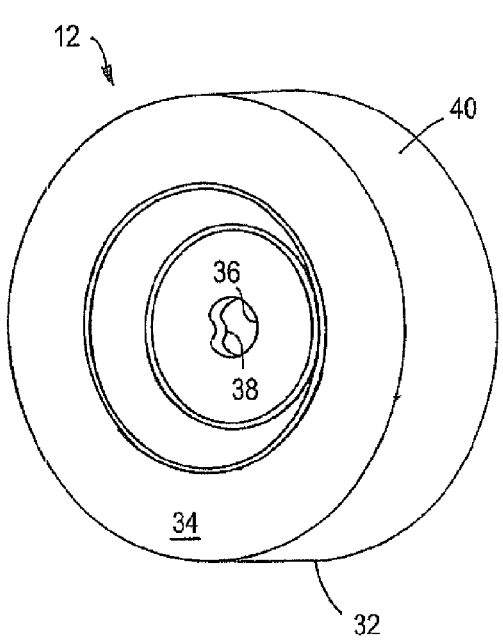
FIG. 3 is a perspective exterior view of the single-piece electro-polished air cylinder shown in FIG. 1.

Referring now to FIGS. 2 and 3, there are respectively illustrated a perspective interior view and a perspective exterior view of the air cylinder 12 shown in FIG. 1. The air cylinder 12 is a one-piece construction including a cylinder portion 32 and a washer portion 34 extending concentrically inward from the cylinder portion 32. This one-piece construction is beneficial for minimizing manufacturing cycle time and costs associated therewith, as one skilled in the art will appreciate that a multiple-piece construction would require an additional sub-assembly process.

In this embodiment, the washer portion 34 has an aperture 36 formed therein and an anchor tab 38 extending therefrom for securing the air cylinder 12 in a predetermined position during the manufacturing process, e.g. a stamping process. For instance, the anchor tab 38 can be utilized for preventing the air cylinder 12 from spinning during the stamping process and/or during the assembly process of the pneumatic fan drive system 10. Specifically, during the assembly process, a fixture can engage the anchor tab 38 and secure the air cylinder 12 in a fixed position as a torque applicator applies torque to the nut 16 and attaches the air cylinder 12 to the piston rod 14.

Moreover, the air cylinder 12 is a single-piece stamping having a deeply drawn construction comprised of mild steel. In this embodiment, the air cylinder 12 is comprised of 1008 steel with a thickness of 0.116 inches. However, it is contemplated that the air cylinder 12 can instead be formed from 1010 steel or various other suitable materials. For that reason, the air cylinder 12 is sufficiently strong and rigid for receiving a fan pilot (not shown) of a fan (not shown) thereon and properly mounting the fan thereto. However, it is contemplated that the air cylinder 12 can instead be comprised of various other suitable materials with a variety of other thicknesses as desired.

One skilled in the art will appreciate that a deeply drawn construction of mild steel can be formed with substantially little or no surface defects. In other words, the mild steel can be more easily formed without tears, cracks, scratches, or other surface blemishes. In this regard, the air cylinder 12 has a deeply drawn construction with a substantially smooth surface 26. The substantially smooth surface 26 can prolong the life of the seal 24 as the seal 24 is repeatedly slid thereacross. This feature is also advantageous for minimizing power lost to frictional forces between the air cylinder 12 and the seal 24.

Also in this embodiment, the surface 26 of the air cylinder 12 has an e-coating 40 applied thereon for further decreasing the coefficient of friction of that surface 26. One skilled in the art will understand that the e-coating is applied to the surface 26 by an immersion process in which charged particles are attracted to the oppositely charged metal air cylinder. As the particles are deposited, a finish begins to insulate the metal from the surrounding charged solution. Deposition continues until the coating thickness is sufficient to form a barrier against further attraction. It will be appreciated that this process can minimize wasted or otherwise unused raw materials. For that reason, the e-coating 40 is beneficial for preserving the environment and minimizing manufacturing costs.

In this embodiment, the e-coating 40 has an average surface roughness of approximately 0.25 to 0.39 micrometers. However, it is understood that the average surface roughness can be less than 0.25 micrometers or greater than 0.39 micrometers as desired. The e-coating is sufficiently durable for lasting at least one million cycles of piston reciprocation. However, it is also contemplated that the e-coating can be sufficiently durable for withstanding more or less than a million cycles as desired.

The e-coating 40 is beneficial for further minimizing frictional forces between the air cylinder 12 and the seal 24. In this way, the e-coating 40 further increases the life of the seal 24 and avoids premature coupling failure. In addition, the e-coating 40 also shields the mild steel from corrosive substances.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. An air cylinder for a pneumatic fan drive system comprising:
    a single-piece stamping utilized for covering a piston of the pneumatic fan drive system;
    said single-piece cylindrical stamping having an e-coating applied thereon for improving a surface finish of said single-piece stamping and inhibiting corrosion of said single-piece stamping;
    said singe-piece stamping having a cylinder portion and a washer portion extending concentrically inward from said cylinder portion;
    said washer portion having an anchor tab extending therefrom for securing said single-piece stamping in a predetermined position during a manufacturing process.

2. The air cylinder recited in claim 1 wherein said washer portion has an aperture formed therein with said anchor tab extending into said aperture.

3. The air cylinder recited in claim 1 wherein said surface finish of said single-piece stamping is utilized for contacting a piston seal member, said surface finish having a predetermined coefficient of friction for minimizing wear on said piston seal member.

4. A pneumatic fan drive system comprising:
    said air cylinder recited in claim 1, and
    a piston rod attached to said air cylinder;
    said piston rod having a channel supplying pressurized air to said air cylinder.

5. An air cylinder for a pneumatic fan drive system comprising:
    a single-piece stamping having a deeply drawn construction comprised of a mild steel, said single-piece stamping being utilized for covering a piston of the pneumatic fan drive system;
    said single-piece cylindrical stamping having an e-coating applied thereon for improving a surface finish of said single-piece cylindrical stamping and inhibiting corrosion of said single-piece cylindrical stamping;
    said single-piece stamping having a cylinder portion and a washer portion extending concentrically inward from said cylinder portion.
    said washer portion having an anchor tab extending therefrom for securing said single-piece stamping in a predetermined position during a manufacturing process.

6. The air cylinder recited in claim 5 wherein said mild steel is one of a 1008 steel material and a 1010 steel material.

7. The air cylinder recited in claim 5 wherein said single-piece stamping has a wall thickness of at least 0.100 inches for stengthening said single-piece stamping.

8. The air cylinder recited in claim 5 wherein said washer portion has an aperture formed therein with said anchor tab extending into said aperture.

9. The air cylinder recited in claim 5 wherein said surface finish of said single-piece stamping is utilized for contacting a piston seal member, said surface finish having a predetermined coefficient of friction for minimizing wear on said piston seal member.

10. A pneumatic fan drive system comprising:
said air cylinder recited in claim 5, and
a piston rod attached to said air cylinder;
said piston rod having a channel supplying pressurized air to said air cylinder.

11. An air cylinder for a pneumatic fan drive system comprising:
a single-piece stamping having a deeply drawn construction comprised of a mild steel, said single-piece stamping being utilized for covering a piston of the pneumatic fan drive system;
said single-piece cylindrical stamping having an e-coating applied thereon for improving a surface finish of said single-piece cylindrical stamping and inhibiting corrosion of said single-piece stamping;
said single-piece stamping including a cylinder portion and a washer portion extending concentrically inward from said cylinder portion.
said washer portion having an anchor tab extending therefrom for securing said single-piece stamping in a predetermined position during a manufacturing process.

12. The air cylinder recited in claim 11 wherein said e-coating has an average surface roughness within a range substantially between 0.25 micrometers and 0.39 micrometers.

13. The air cylinder recited in claim 11 wherein said mild steel is one of a 1008 steel material and a 1010 steel material.

14. The air cylinder recited in claim 11 wherein said single-piece stamping has a wall thickness of at least 0.100 inches for strengthening said single-piece stamping.

15. The air cylinder recited in claim 11 wherein said washer portion has an aperture formed therein with said anchor tab extending into said aperture.

16. The air cylinder recited in claim 11 wherein said surface finish of said single-piece stamping is utilized for contacting a piston seal member, said surface finish having a predetermined coefficient of friction for minimizing wear on said piston seal member.

17. A pneumatic fan drive system comprising:
said air cylinder recited in claim 11, and
a piston rod attached to said air cylinder;
said piston rod having a channel supplying pressurized air to said air cylinder.

* * * * *